Dec. 5, 1961 J. T. DOTY 3,011,821
PIPE HANDLING TONGS
Filed July 17, 1959
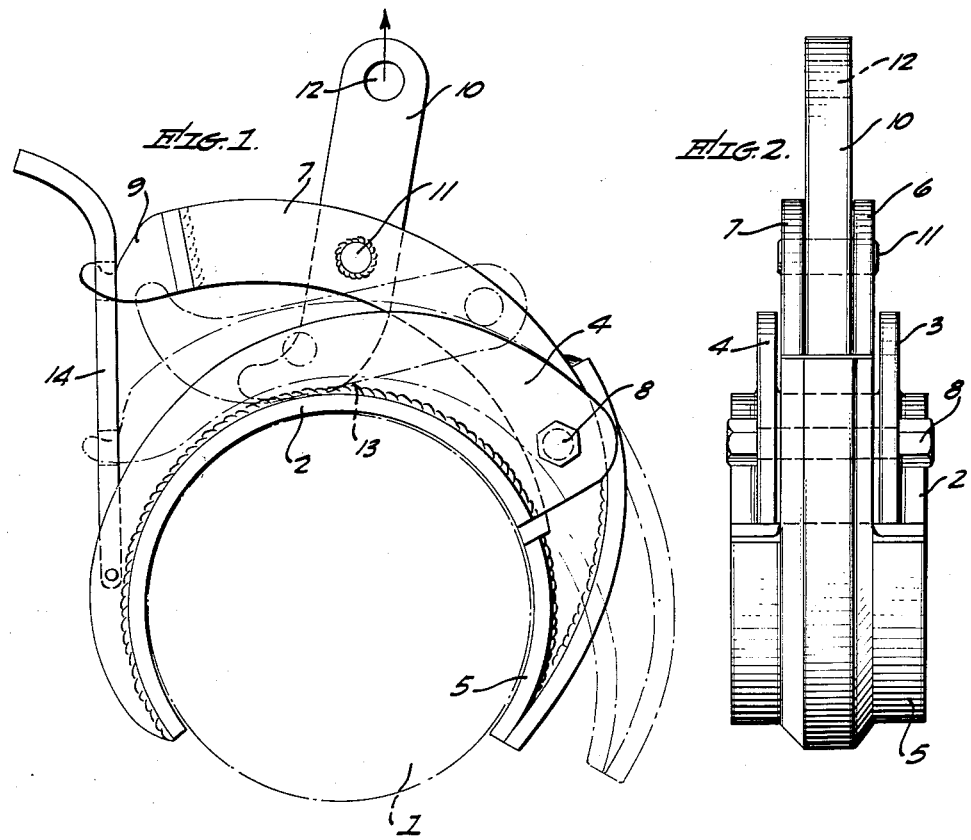
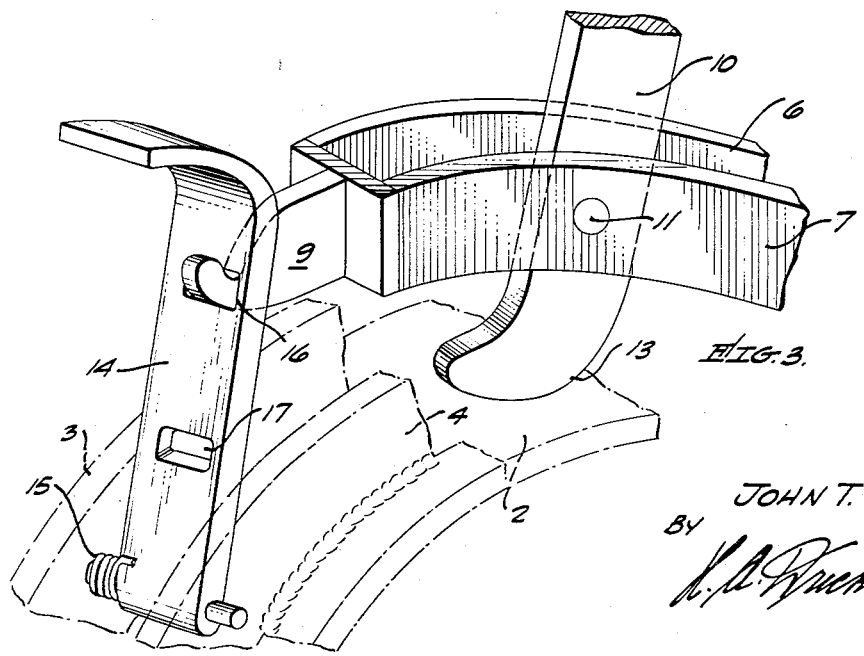
INVENTOR.
JOHN T. DOTY,
BY
ATTORNEY.

3,011,821
PIPE HANDLING TONGS
John T. Doty, 9936 E. Ramona Ave., Bellflower, Calif.
Filed July 17, 1959, Ser. No. 827,765
5 Claims. (Cl. 294—104)

This invention relates to a pipe handling tongs whereby lengths of pipe may be raised or lowered into a trench.

An object of my invention is to provide a novel pipe handling tongs which is very little greater in diameter than the pipe itself, so that the pipe and tongs can be lowered into a trench of minimum width.

Another object of my invention is to provide a novel latching means which will hold the tongs in both open and closed position so that the tongs can be readily manipulated as required to handle the pipe.

Still another object of my invention is to provide a novel camming link which will assist in holding the tongs in closed or gripping position.

Still another object of my invention is to provide a novel pipe handling tongs which is simple and compact in construction and which embodies a safety latch to hold the tongs in both open and closed position, and also where the weight of the tongs and the pipe will assist in holding the tongs in closed or gripping position.

Other objects, advantages and features of invention may appear from the accompanying drawing, the subjoined detailed description and the appended claims.

In the drawing:
FIGURE 1 is an end view of my tongs.
FIGURE 2 is a side view of the same.
FIGURE 3 is a fragmentary perspective view illustrating the latch and the camming link.

Referring more particularly to the drawing, my pipe handling tongs are adapted to engage a pipe 1 throughout an area somewhat greater than an arc of 180°. The main gripping portion of the tongs consists of an arcuate shoe 2 which is equal to or less than an arc of 180° in length. This portion of the tongs can, therefore, be readily placed against the pipe 1 and partially encircles the pipe. A pair of flanges 3—4 project upwardly from the shoe 2 and are substantially at right-angles to the surface of this shoe. The flanges 3 and 4 are fixedly secured to the shoe preferably by welding or by an integral construction or the like.

A segment 5 also engages the outer surface of the pipe 1 and this segment, in combination with the main shoe 2, partially encircles the pipe for a distance somewhat greater than an arc of 180°. A pair of parallel arms 6 and 7 project from the segment 5 and these arms are positioned between the flanges 3—4. A pivot pin 8 extends through the flanges 3—4 and the arms 6—7, thus pivotally mounting the segment 5 and the arms 6—7 to the flanges 3—4. It is thus evident that an upward movement of the arms 6—7 relative to the arcuate shoe 2 will swing the segment 5 inwardly against the pipe 1. The outer ends of the arms 6—7 are connected by a hook 9 which is fixedly secured to the arms, or may be an integral part thereof.

A lift link 10 is pivotally secured to the arms 6—7 by means of the pivot pin 11. A lifting cable or hook (not shown) may be attached to the link 10 by extending through the hole 12 adjacent the upper end of the link. The lower end of the link 10 is curved to form a cam surface 13 which bears against the upper surface of the shoe 2. Thus as the link 10 is pulled upwardly by the lifting mechanism it will swing on its pivot 11, and the cam surface 13 engaging the shoe 2 will cam the segment 5 inwardly against the pipe 1; thus securely pinching the pipe between the shoe 2 and the segment 5 and securely holding this pipe during the time that it is being moved. The cam surface 13 will also prevent chattering or movement of the segment 5 while the tongs are engaging the pipe 1 and there is, therefore, less likelihood of any slippage or movement of the pipe relative to the tongs while the pipe is being manipulated.

A latch plate 14 is pivotally attached at one end between the flanges 3—4. A spring 15 engages the plate 14 to press this latch plate towards the hook 9. A pair of spaced holes 16—17 in the plate 14 are adapted to receive the hook 9 for the purpose of holding the arms 6—7 and the segment 5 either in pipe engaging position, as shown in solid lines in FIG. 1, or in a released position, as shown in dotted lines in FIG. 1. The latch plate 14, therefore, holds the arms 6—7 in either the pipe engaging or disengaging position which constitutes a safety feature, so that the tongs can neither engage nor disengage the pipe until the latch plate 14 is manually swung to a position to disengage the hook 9.

*In operation*

The pipe handling tongs are suspended from a cable or line which is attached to the lift link 10 by being passed through the hole 12. The outer ends of the arms 6—7 are first pressed downwardly and the hook 9 extends through the hole 17 in the latch plate 14. In this position the segment 5 is swung away from the pipe 1 so that the entire tongs can be lowered until the arcuate shoe 2 rests on the pipe. The latch plate 14 is now manually swung away from the hook 9 to disengage the hook and the lifting mechanism pulls upwardly on the link 10. The link now swings on its pivot 11 and the cam surface 13 presses against the outer surface of the shoe 2. The arms 6—7 are thus pivoted on the pin 8 to swing the segment 5 inwardly against the pipe 1 and securely latching the tongs in engagement with the pipe. In this position the hook 9 engages the hole 16 to hold the tongs in pipe engaging position.

Having described my invention, I claim:

1. A pipe handling tongs comprising an arcuate shoe said shoe having a length of about 180° of arc of the engaged surface of the pipe, a pipe engaging segment materially less in length than the length of said shoe, and positioned at one end of the shoe, an arm extending from the segment, means pivotally mounting said arm on the upper surface of the shoe, and a lift link pivotally mounted on said arm adjacent the end of the arm opposite said segment, latch means engaging said arm to hold said arm in position of disengagement of the segment with the pipe.

2. A pipe handling tongs comprising an arcuate shoe said shoe having a length of about 180° of arc of the engaged surface of the pipe, a pipe engaging segment materially less in length than the length of said shoe, and positioned at one end of the shoe, an arm extending from the segment, means pivotally mounting said arm on the upper surface of the shoe, and a lift link pivotally mounted on said arm adjacent the end of the arm opposite said segment, latch means engaging said arm to hold said arm in position of disengagement of the segment with the pipe, a cam surface on the end of the lift link engaging the shoe.

3. A pipe handling tongs comprising an arcuate shoe said shoe having a length of about 180° of arc of the engaged surface of the pipe, a pipe engaging segment materially less in length than the length of said shoe, and positioned at one end of the shoe, an arm extending from the segment, a flange projecting from said upper surface of the shoe, a pivot pin extending through the flange and said arm to pivotally mount the arm on the shoe, and a lift link pivotally mounted on said arm adjacent the end of the arm opposite said segment, and a cam surface on said lift link engaging the shoe, a latch plate pivotally mounted at one end thereof to said flange, a hook on the outer end of said arm, said latch plate having spaced holes therein to receive the hook and hold said arm in different positions relative to said shoe.

4. A pipe handling tongs comprising an arcuate shoe of less than 180° of arc, a pipe engaging segment of materially lesser length than said shoe, an arcuate arm fixed with relation to the segment and extending therefrom and partly over said shoe, means pivotally mounting said arm on the shoe, a lift link pivotally mounted to the arm between the pivot and the end of the arm opposite the segment, a cam surface on the lift link on the end engaging said shoe, a latch plate pivotally mounted on the arcuate shoe and engaging said arm to hold said arm in position of disengagement of the segment with the pipe, the latch plate being releasable from engagement with the arm.

5. A pipe handling tongs comprising an arcuate shoe of less than 180° of arc, a pipe engaging segment of materially lesser length than said shoe, an arcuate arm fixed with relation to the segment and extending therefrom and partly over said shoe, said arm being formed of two spaced and parallel plates, a pair of spaced and parallel flanges projecting from one side of said shoe, a pivot pin extending through the parallel plates of the arm and the parallel flanges of the shoe to pivotally mount said arm on the shoe, a lift link pivotally mounted on the spaced plates forming the arm between the first named pivot and the end of the arm opposite the segment, a cam surface on the lift link on the end engaging said shoe, a latch plate pivotally mounted on the arcuate shoe between the flanges on the shoe and engaging said arm to hold said arm in position of disengagement of the segment with the pipe, said latch plate being releasable from engagement with the arm.

References Cited in the file of this patent

UNITED STATES PATENTS

| 604,758 | Jeansen | May 31, 1898 |
| 2,342,506 | Wrobbel | Feb. 22, 1944 |
| 2,520,815 | Shaboo | Aug. 29, 1950 |
| 2,617,678 | Kelso | Nov. 11, 1952 |

FOREIGN PATENTS

| 27,613 | Great Britain | Dec. 8, 1911 |